J. R. MITCHELL.
SIDE BEARING.
APPLICATION FILED JUNE 9, 1917.

1,290,284.

Patented Jan. 7, 1919

WITNESSES:
Wm. Geiger

INVENTOR.
John R. Mitchell
BY George J. Haight
ATTORNEY

UNITED STATES PATENT OFFICE.

JOHN R. MITCHELL, OF CHICAGO, ILLINOIS, ASSIGNOR TO WILLIAM H. MINER, OF CHAZY, NEW YORK.

SIDE BEARING.

1,290,284.  Specification of Letters Patent.  Patented Jan. 7, 1919.

Application filed June 9, 1917. Serial No. 173,878.

*To all whom it may concern:*

Be it known that I, JOHN R. MITCHELL, a citizen of the United States, residing at Chicago, in the county of Cook and State of Illinois, have invented a certain new and useful Improvement in Side Bearings, of which the following is a full, clear, concise, and exact description, reference being had to the accompanying drawings, forming a part of this specification.

This invention relates to improvements in side bearings.

The object of the invention is to provide a relatively simple and inexpensive side bearing more particularly adapted for use on railway cars and wherein a rotatable anti-friction roller is employed that is adjustable to accommodate itself to varying angles between the bolsters or other members between which it is interposed.

Figure 1:
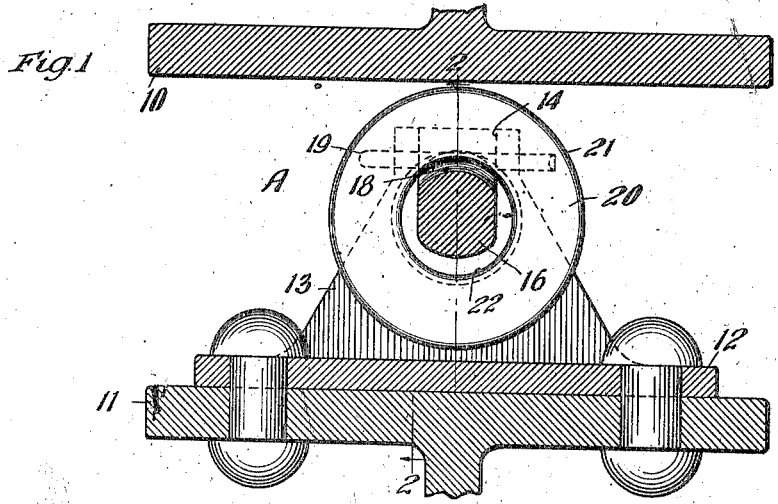
Figure 2:
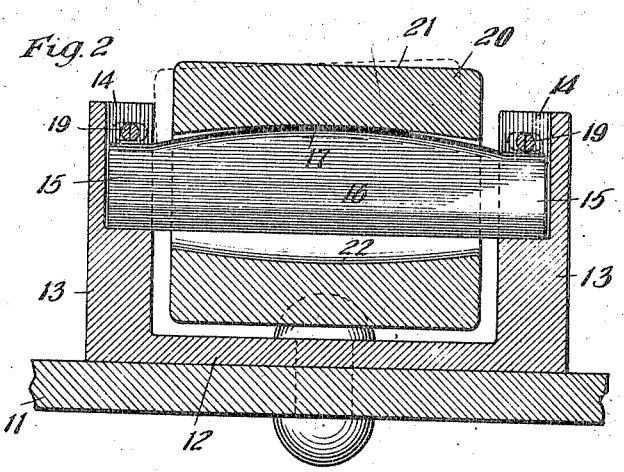
Figure 3:

In the drawing forming a part of this specification, Figure 1 is a vertical sectional view through portions of a body and truck bolster of a car showing my improvements in connection therewith. Fig. 2 is a vertical sectional view, taken substantially on the line 2—2 of Fig. 1. And Fig. 3 is an end elevational view of a modified form of a supporting or bearing member for the roller.

In said drawing, 10 denotes a portion of a body bolster and 11 a portion of a truck bolster, the improved side bearing, designated generally by the reference A, being shown as attached to the truck bolster.

The side bearing A, as shown, comprises a base casting 12 riveted or otherwise secured to the truck bolster 11 and having a pair of up-standing side walls 13—13, each of said side walls 13 being of somewhat triangular shape, as indicated in Fig. 1 and each provided on its inner face with a vertically extending slot 14. The slots 14 are adapted to receive the ends 15 of a supporting bar or member 16, the latter having its upper edge rounded both transversely and longitudinally, as indicated at 17 in Fig. 2 and 18 in Fig. 1. The supporting bar 16 is prevented from accidental displacement by any suitable means, such as the cotters 19. Loosely and rotatably supported on the bearing member 16 is the anti-friction roller 20 having a cylindrical outer bearing surface 21 and a hollow interior concave bearing surface 22 of somewhat greater radius than the radius of the longitudinal curved surface of the bearing member 16. Furthermore, the diameter of the interior of the roller 20 is made considerably larger than the maximum vertical diameter of the supporting member 16 so that the roller 20 is loose with respect to the member 16 and cannot only rotate but accommodate itself readily to various positions on the member 16, as indicated by the dotted lines in Fig. 2. By this means, it is apparent that the contacting surface of the anti-friction roller 20 can readily compensate for variations in the angle between the bearing surfaces of the truck and body bolsters or other members between which the bearing is interposed. In other words, the anti-friction roller is not only rotatable but is adjustable about an axis at right angles to its axis of rotation.

I claim:

1. In a bearing of the character described, the combination with a bearing casting, of a transversely extending bearing member supported by said casting and having rounded bearing surfaces, of a roller having a central opening and loosely rotatably mounted on said bearing member, the minimum diameter of said opening being greater than the maximum transverse dimension of said bearing member to thereby permit assembling of the roller and bearing member by slipping the one over the other.

2. In a side bearing, the combination with a supporting casting, of a bearing member mounted in said casting, said bearing member having a bearing surface curved transversely and longitudinally of said bearing member, and an anti-friction roller loosely rotatably mounted on said bearing member, the inner bearing surface of said roller being curved to correspond to the curved surfaces of said bearing member, said roller being provided with a central opening in which to receive the bearing member, the smallest dimension of said opening being greater than the maximum transverse dimension of the bearing member.

3. In a side bearing, the combination with a base casting adapted to be secured to a bolster, said casting having a pair of up-standing walls, of a bearing member extending between and supported by said walls, said bearing member having its upper surface curved transversely and longitudinally thereof, and a single element anti-friction roller centrally recessed, the surface of the recess being curved in directions transversely and longitudinally of the axis of the roller and loosely fitting said bearing member whereby the anti-friction roller is rotatable and also adjustable about an axis transverse to its axis of rotation.

In witness that I claim the foregoing I have hereunto subscribed my name this 19th day of May, 1917.

JOHN R. MITCHELL.